US008346585B1

(12) United States Patent
Griffith et al.

(10) Patent No.: US 8,346,585 B1
(45) Date of Patent: Jan. 1, 2013

(54) DATA MINING FOR TARGETED REPUBLISHING

(75) Inventors: Victoria A. Griffith, Seattle, WA (US); Jeffrey L. Belle, Seattle, WA (US); Mary Ellen Fullhart, Seattle, WA (US); Daniel Leng, Seattle, WA (US); Michael Anthony Frazzini, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 640 days.

(21) Appl. No.: 12/464,053

(22) Filed: May 11, 2009

(51) Int. Cl.
*G06Q 10/00* (2012.01)
(52) U.S. Cl. .................................. 705/7.11; 705/7.29
(58) Field of Classification Search .................. 705/7.11, 705/7.29
See application file for complete search history.

(56) References Cited

U.S. PATENT DOCUMENTS

| | | | |
|---|---|---|---|
| 4,674,043 A | 6/1987 | Hernandez et al. | |
| 6,321,221 B1 | 11/2001 | Bieganski | |
| 7,848,956 B1 | 12/2010 | MacLean | |
| 2002/0123924 A1 | 9/2002 | Cruz | |
| 2002/0161664 A1 | 10/2002 | Shaya et al. | |
| 2002/0165756 A1 | 11/2002 | Tobin et al. | |
| 2002/0169657 A1 | 11/2002 | Singh et al. | |
| 2002/0198699 A1* | 12/2002 | Greene et al. | 704/2 |
| 2003/0115097 A1 | 6/2003 | Sokei et al. | |
| 2003/0187802 A1 | 10/2003 | Booth | |
| 2005/0222888 A1 | 10/2005 | Hosoda et al. | |
| 2006/0149616 A1 | 7/2006 | Hildick-Smith | |
| 2006/0195356 A1 | 8/2006 | Nerenhausen et al. | |
| 2007/0198363 A1* | 8/2007 | Quoc et al. | 705/26 |
| 2008/0028300 A1* | 1/2008 | Krieger et al. | 715/255 |
| 2008/0046913 A1 | 2/2008 | Dear | |
| 2008/0141117 A1* | 6/2008 | King et al. | 715/238 |
| 2008/0154696 A1 | 6/2008 | Spiegelman et al. | |
| 2008/0300863 A1* | 12/2008 | Smith | 704/9 |
| 2009/0112680 A1 | 4/2009 | Dovrath et al. | |
| 2009/0138349 A1 | 5/2009 | Drucker et al. | |
| 2009/0150303 A1 | 6/2009 | MacMillan et al. | |
| 2009/0248542 A1 | 10/2009 | Houvener et al. | |
| 2010/0081457 A1 | 4/2010 | Jerome et al. | |
| 2010/0161499 A1 | 6/2010 | Holcombe et al. | |
| 2010/0325205 A1 | 12/2010 | Murphy et al. | |

OTHER PUBLICATIONS

"BookTour: Where Authors and Audiences Meet", retrieved on Aug. 12, 2009 at <<http://www.booktour.com/>>, Booktour.com, entire website, 2 pages.
"FiledBy—Author websites, author directory, author search", retrieved on Aug. 12, 2009 at <<http://www.filedby.com/>>, filedby.com, entire website, 3 pages.
"LinkedIn", retrieved on Jul. 20, 2009 at <<http://www.linkedin.com/>>, LinkedIn Corporation, entire website, 1 page.
Author House, "Planning, Promoting, and Conducting a Worthwhile Book Signing", Apr. 2009, 2 pages.
Office action for U.S. Appl. No. 12/425,877, mailed on Jul. 19, 2011, 29 pages.

(Continued)

*Primary Examiner* — Thomas Mansfield
(74) *Attorney, Agent, or Firm* — Lee & Hayes, PLLC

(57) ABSTRACT

A system and method of data mining for republishing is described. In some embodiments products having a high potential for increased sales through republishing are identified based on relationships with products having consistent sales. In some embodiments products having a high potential for increased sales through republishing are identified based on sales in one language and availability of rights in another language. In one aspect, translations are facilitated via a translations marketplace.

41 Claims, 11 Drawing Sheets

OTHER PUBLICATIONS

Teradata, "Event-Based Communication Solution", Retrieved from the internet at www.teradata.com/resources/brochures/Teradata-Event-Based-Communication-Solution-eb4598/ on Jul. 7, 2011, 4 pages.

Non-Final Office Action for U.S. Appl. No. 12/464,026, mailed on Dec. 23, 2011, Victoria A. Griffith et al., "Data Mining for Targeted Republishing", 27 pages.

* cited by examiner

My Titles

Displaying 1 to 3 of 3 rows [+ Add a Title]  ⟵ 402

Filter by: [Date Added ▼] [Go]  ⟵ 404, 406

| Date Added | | ISBN/UPC/EAN | Title | Formats | Status | Language | [Update All] |
|---|---|---|---|---|---|---|---|
| 4/24/09 | 📕 | 18300400945 | Grace and Me | E-Book, Book | Proposal in Review | French, German | Edit |
| 4/23/09 | 📕 | 18300400142 | Go, Griffin, Go: A Father's Tale | Book | Negotiation | Japanese | Edit |
| 4/22/09 | 📘 | 15884440020 | Jacquelin's Journey | Book, Audio | Completed Contracted | German, German | Edit |

DATA MINING FOR TARGETED REPUBLISHING

BACKGROUND

In sales of published works such as books, newspapers, magazines, articles, games, etc. authors and creators seek to increase sales of their works typically via publishers marketing the works. Many times the author/creator, in order to enjoy a fruitful relationship with a publisher, agrees to create additional titles beyond the one they are currently seeking to market and includes publishing rights to those future works in the current contract. Author/creators with existing track records may receive more favorable terms or be in a better position to negotiate. This process favors well known authors and creators with whom the publisher already has a relationship.

Furthermore, a publisher may limit the marketing and/or distribution of a given work due to language, distribution, format, and other constraints, thereby limiting potential sales of the work. Thus, an author/creator may find themselves under contract and not receiving the best return for a particular work, or may have a work for which the contract has expired while there is still intermittent demand for the work.

In other situations, an author/creator may opt to self-publish a work when no publisher offers a contract for publication. Self-published works tend to have lower sales due at least in part to lack of marketing as compared to books published by a publishing house. A self-publishing author/creator is forced to devote more time to conduct marketing and bear the expense of that marketing, further limiting the sales streams in which the work is active. For example a self-published author/creator may forego national or international promotions, resulting in more limited sales streams for their works based primarily on local or regional promotion and sales in local or regional venues. By foregoing or limiting, for example, online venues, chain store venues, etc. the works are not active in as many sales streams.

Accordingly, there is a need to effectively determine works from these groups with a potential for increased sales if the above limitations were overcome.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "104 (1)" or "**112(*a*)") identifies a species of the feature represented by the general reference number (e.g., "104" or "112"); further, use of the general reference number without a parenthetical suffix (as in "104" or "112**") identifies the genus or any one or more of the species.

FIG. 4 illustrates an example user interface (UI) of an author focused tool.

DETAILED DESCRIPTION

Introduction

This disclosure is directed to techniques and systems for data mining for targeted republishing implemented at least in part via a computing device. The described techniques and systems facilitate identification of published works such as books, audio books, newspapers, magazines, articles, games, works of art, etc. for targeted republishing based at least in part on criteria indicative of particular prospects for increased sales. Published works may be identified in a manner customized to a user request and may be provided without further user interaction. In at least one embodiment, an entity associated with facilitating the targeted republishing may own or obtain distribution rights for the republished work.

In some embodiments, a catalog of published works is mined for information associated with particular works, and based on the mined information, possible targets for republication are identified. Of the identified possible targets, research including computer implemented correlation with other works and possible reviewers is completed to select works for further processing. Results of the further processing, including preliminary reviews are mined, and calculations of anticipated republication sales are made to select particular works for republication.

In some embodiments, information mined from the catalog of published works includes the works being published in one language without being published in another language. These works are identified as targets for possible republication based on availability of rights for publishing in the second language and securing translation. In at least one embodiment, translation may be secured via a translation marketplace enabling extension of these techniques to identify and contract with translators. Identified possible targets for republication may also be further processed including correlation research, preliminary review in the second language, etc., and results of the further processing, including preliminary reviews mined, and calculations of anticipated republication sales made to select particular works for republication.

Illustrative Architecture

Figure 1:
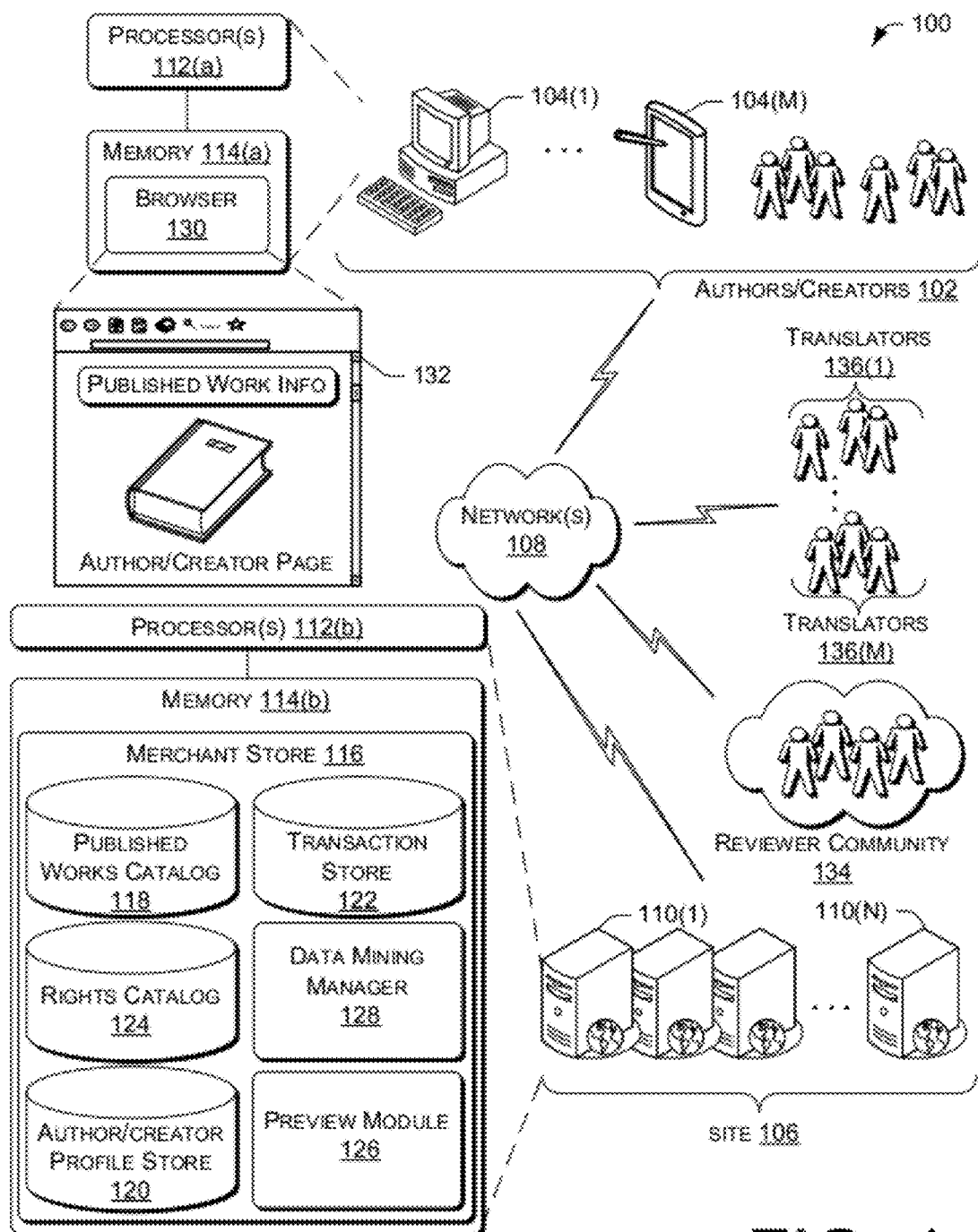
FIG. 1 is an overview showing illustrative aspects of an architecture in which data mining for targeted republishing functionality can be deployed.

FIG. 1 is an overview showing illustrative aspects of an architecture 100 in which the claimed systems and techniques may be implemented. In the architecture 100, authors/creators 102 may utilize user computing devices 104(1), . . . , 104(M) to access a site interface 106 via a network 108. The network 108 represents any one or combination of multiple different types of networks, such as cable networks, the Internet, and wireless networks.

One or more servers 110(1), . . . , 110(N), perhaps arranged in a cluster or as a server farm, host the site 106 or another type of information server. Other server architectures may also be used to host the site 106. The site 106 is capable of handling requests from many authors/creators and serving, in response, various web pages that can be rendered at the user computing devices 104(1)-(M). The site 106 can be any type of site that supports author/creator interaction, including online retailers, informational sites, social networking sites, blog sites, search engine sites, news and entertainment sites, and so forth.

Computing devices 104(1), . . . , 104(M) include one or more processors 112(*a*) and memory 114(*a*), and servers 110(1), . . . , 110(N) include one or more processors 112(*b*) and memory 114(*b*). Memory 114 may include volatile memory (such as RAM), nonvolatile memory, removable memory, and/or non-removable memory, implemented in any method or technology for storage of information, such as computer-readable instructions, data structures, program modules, or other data. Also, the processor(s) 112 may include onboard memory in addition to or instead of the memory 114. Some examples of storage media that may be included in memory 114 and/or processor(s) 112 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 112.

In the illustrative environment, the site 106 represents a site tailored to author/creators that hosts pages for author/creators individually, as an author/creator community, and pages for author/creators to interact with customers or reviewers. In some embodiments, site 106 may host an electronic catalog with one or more products available for purchase separately or in conjunction with author/creator pages.

In FIG. 1, a merchant store 116 is implemented via processor 112 in memory 114 of one or more of the servers 110. The merchant store 116 comprises one or more electronic catalogs of products available for purchase such as published works catalog 118 of published works (e.g., books, audio books, newspapers, magazines, articles, games, works of art, etc.). Products may be offered for sale, rent, lease, or other consumption by one or more online retailers or other retailers. The published works catalog 118 stores a published works detail page for each published work in the catalog. The merchant store 116 also includes an author/creator profile store 120 and a transaction store 122. The author/creator profile store 120 includes information about authors/creators, such as author/creator biographical information, published works information, touring information, and other information associated with the author/creator. The merchant store 116 also includes a rights catalog 124 and a preview module 126. The rights catalog 124 includes information about publishing, performing and display rights from published works, such as rights by country, rights by language, rights by format (e.g. print, oral, e-book, etc.), and other information associated with rights to published works. The transaction store 122 is in communication with the author/creator profile store 120, and includes information about sales and other transactions of author/creator published works. A more detailed discussion of the author/creator profile store 120 in conjunction with site 106 is provided in co-pending application Ser. No. 12/425, 877, which is titled "Author Focused Tools" and was filed on Apr. 17, 2009. In at least one embodiment, the transaction store 122 is in communication with rights catalog 124, and includes information about rights available and/or transactions in process designed to exploit available rights such as by facilitating publishing in additional languages and/or formats.

The merchant store 116 also includes a data mining manager 128, which is responsible for managing data mining and republishing operations and communications between the published works catalog 118, the author/creator profile store 120, the transaction store 122, the rights catalog 124, and a preview module 126. As described in more detail below, the data mining manager 128 populates queues of products from previous purchase requests along with appropriate transaction information on published works detail pages, search pages, or other pages to capture information that may be used to forecast opportunities for increased sales via targeted republishing.

In at least one embodiment, authors/creators may submit published works for republishing consideration via the site 106 using computing devices 104(1)-(M). The user computing devices 104(1)-(M) may be implemented as any number of computing devices, including as a personal computer, a laptop computer, an electronic book reader, a portable digital assistant (PDA), a mobile phone, a set-top box, a game console, and so forth. As illustrated, each user computing device is equipped with one or more processors 112 and memory 114 to store applications and data. According to some embodiments, a browser application 130 is shown stored in the memory 114 and is executable on the processor(s) 112 to provide access to the site 106. The browser 130 renders web pages served by the site 106 on an associated display 132. Although embodiments, are described in the context of a web-based system, other types of client/server-based communications and associated application logic could be used.

In at least one embodiment, data mining of published works for targeted republishing consideration occurs without author/creator submissions. In these embodiments, published works are automatically considered without author/creator submission based on one or more of a variety of criteria such as number of units sold, ratio of units sold per venue, number of reviews, average ratings, association with other products, sales trends, etc. In another embodiment, author/creator or other submissions may be considered in combination with one or more automatic processes for identifying high potential published works for republishing.

As FIG. 1 illustrates, the architecture 100 further includes a reviewer community 134. The reviewer community comprises a group of human users that review content that the site 106 provides or other content. Furthermore, each reviewer of the group of reviewers may have an expertise in one or more areas. In some embodiments, reviews by a reviewer community or individual reviewers of a reviewer community may be referred to, obtained, solicited, or otherwise sourced at various times in the process of data mining for targeted republishing. For example, reviews may be submitted or obtained as part of instigating data mining for targeted republishing of a particular published work. In another non-exclusive example, a review may be obtained at any time during execution of the overall process. In yet another non-exclusive example, review of the republished work may be obtained toward the end of the data mining for targeted republishing process. In some embodiments, reviewers' areas of expertise may be in languages, and their review may include reviewing samples, excerpts, or completed translations by one or more translators 136(1)-(M).

Figure 2:
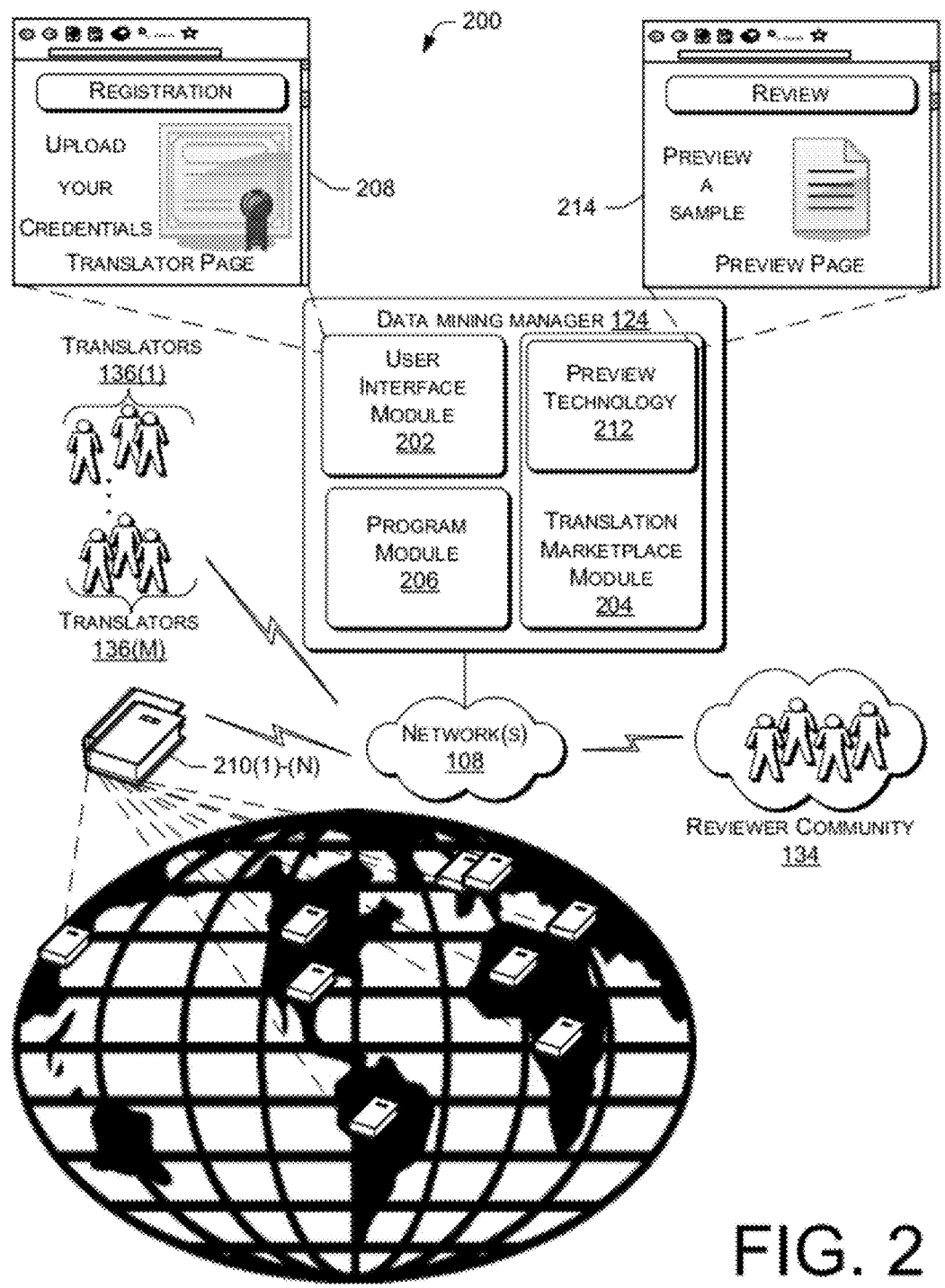
FIG. 2 is an overview showing additional illustrative aspects of an architecture in which data mining for targeted republishing functionality can be deployed.

FIG. 2 is an overview showing illustrative aspects of an architecture 200 in which the claimed systems and techniques may be implemented. In at least one embodiment, the architecture 200 is an extension of architecture 100 introduced in FIG. 1. A variety of application program modules represented by blocks 204 and 206 are usable to implement the site 106 and other functionality included in data mining manager 128. In at least one embodiment, architecture 200 represents a community platform for authors and/or rights owners and translators to meet and enable the publication of works into multiple languages. One function of architecture 200 is facilitating authors and users associated with the author (e.g. publishers, rights holders, etc.) to shop their foreign language translation opportunities directly to translators, reducing the friction involved in traditional sub-rights sales and expanding the number of translations available worldwide.

An illustrative user interface module 202 serves as an interface with computing devices such as devices 104 and 110. For example, when an author/creator 102 accesses the site 106, the computing device 104 submits a request, such as in the form of a uniform resource locator (URL), to servers 110(1)-(N). Upon receiving the request, the user interface module 202 returns an appropriate web page 132 back to the requesting computing device. In the context of site 106, the returned display 132 may comprise a product detail page, such as a web page, from which an author/creator may submit a republication request associated with the detail page. In some aspects, an author/creator may track results of products active in the republication process, or under consideration for the republication process, including royalty information and stored contracts. In additional aspects, an author/creator may track the status of works submitted for republication involving translation, including information such as works out for bid for translation, works in negotiation for translation, translation contracts in process, works for which one or more translations are complete, and royalties information for translated works. In some embodiments, the author/creator may communicate with one or more translators.

As another example, when a translator 136 accesses site 106, the computing device 104 submits a request, such as a URL, to servers 110(1)-(N). Upon receiving the request, the user interface module 202 returns an appropriate web page 208 back to the requesting computing device. In the context of site 106, the returned display 208 may comprise a registration page, such as a web page, from which a potential translator may submit credentials such as a resume, a curriculum vitae, a list of previous works translated, samples of previous translations, reviews of previous translations, etc. In another aspect the site may encourage the translator to provide this information by, for example, informing the translator regarding a completeness (or lack thereof) of the translator's page. In another aspect, a translator may track results of products active in the republication process, or under consideration for the republication process including reputation information based on author/creator and/or reviewer feedback and stored contracts. In additional aspects, a translator may view available translation jobs, submit proposals for translation jobs, track the status of previous translation proposals including information such as previous bid proposals and previous bid proposals in negotiation, translation contracts in process, one or more completed translations, royalty information for translated works, and may communicate with one or more authors/creators.

In at least one embodiment, an illustrative translation marketplace module 204 serves as an interface for translators 136(1)-(M) via computing devices such as 104 and 110. As further illustrated, in some embodiments, the data mining manager 128 via translation marketplace module 204 may link translators 136(1)-(M) with translation opportunities 210 (1)-(N) using network 108. Translation marketplace module 204 in at least one embodiment, links translators 136(1)-(M) with translation opportunities 210(1)-(N), directly such as by email or peer-to-peer. In at least one other embodiment, translation marketplace module 204 links translators 136(1)-(M) with translation opportunities 210(1)-(N) indirectly such as using an association or referral service. Further embodiments, may combine direct and indirect linking between translators 136(1)-(M) and translation opportunities 210(1)-(N), As illustrated, translation opportunities may be identified for a plurality of published works (e.g., books, audio books, newspapers, magazines, articles, games, works of art, etc.) for which republication is desired from one language to another one or more languages from around the world. Further discussions of processes embodied by data mining manager 128 via translation marketplace module 204 are presented below with regard to FIGS. 9, 10, and 11.

In another aspect of some embodiments, reviewer community 134 may review translations facilitated by translation marketplace 204 via a preview technology 212. In some embodiments, preview technology 212 leverages preview module 126. Although preview technology 212 is illustrated as a part of translation marketplace 204, preview technology 212 may also be implemented independently. In at least one embodiment, preview technology 212 facilitates creating a preview page 214. Further discussion of preview technology is presented below with regard to FIG. 8.

Figure 3:
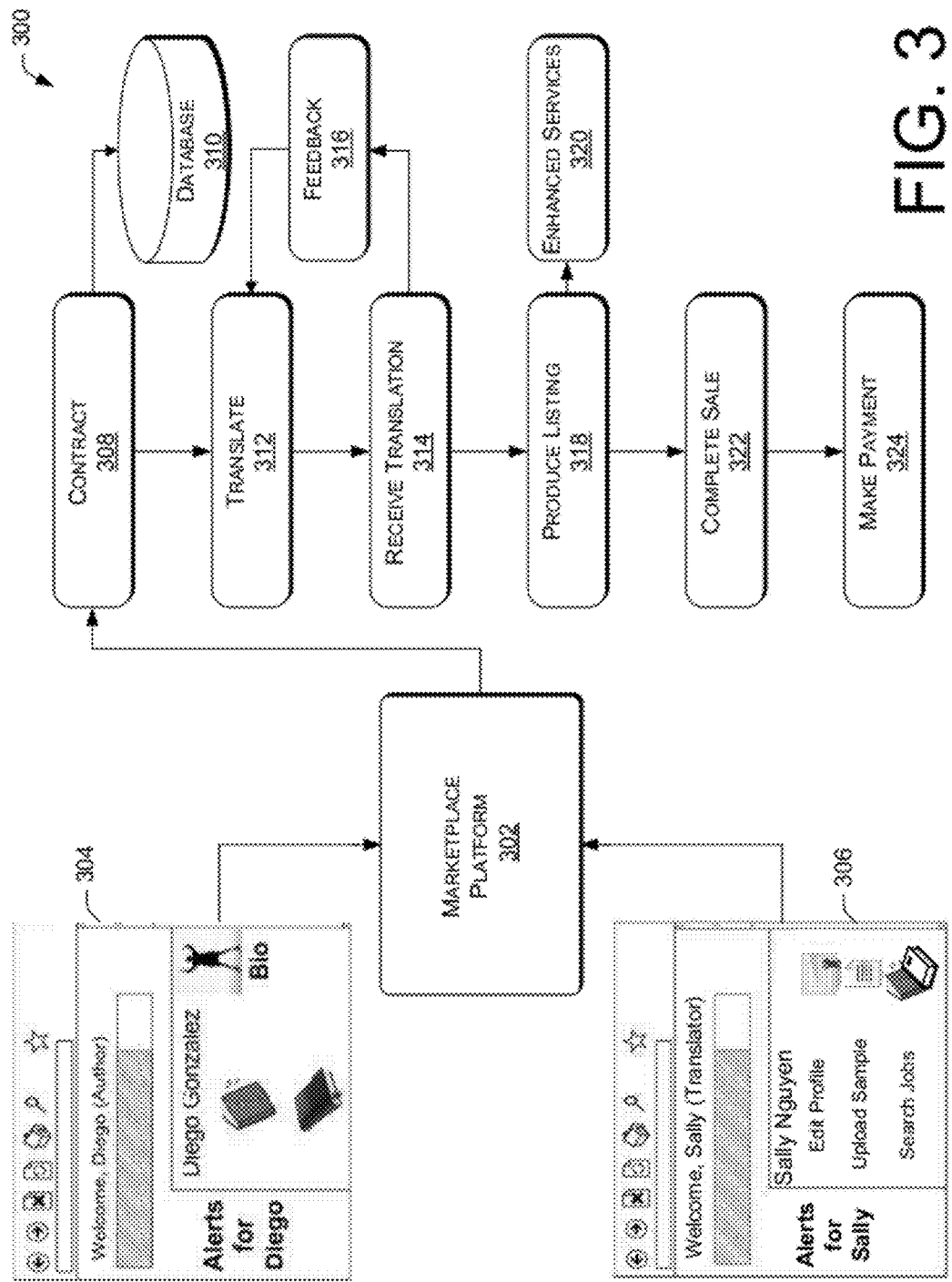
FIG. 3 is a system/process overview showing illustrative aspects of data mining for targeted republishing.

FIG. 3 is an overview showing illustrative aspects of an architecture 300 in which the claimed systems and techniques may be implemented. In at least one embodiment, the architecture 300 is an extension of architecture 100 introduced in FIG. 1 and/or architecture 200 introduced in FIG. 2. Architecture 300 illustrates how authors/creators 102 and translators 136 may interact with site 106 via a marketplace platform 302. In some embodiments, authors/creators 102 make a published work available for translation utilizing an author focused tool via author portal 304. In at least one embodiment, such an author portal may be implemented via "Author Focused Tools" as provided in the co-pending application Ser. No. 12/425,877, which was filed on Apr. 17, 2009. In at least one embodiment, author portal 304 facilitates collection of rights information for published works for inclusion in rights catalog 124. In some embodiments, translators 136 make translation services available to authors/creators 102 utilizing a translator focused tool via translator portal 306.

Marketplace platform 302 represents a community where authors/creators 102 and translators 136 can interact via their respective portals, and in some embodiments, marketplace platform 302 is administered via translation marketplace module 204. In some embodiments, the author portal 304 facilitates production of a translation listing for marketplace 302 that includes metrics data to be presented to a potential translator. Metrics data may be based on one or more of sales volume or velocity, correlation scores, etc. In some embodiments, the translator portal 306 facilitates production of a translator listing for display using marketplace platform 302. In at least one embodiment, translator listings include reputation data for translators to be presented to authors. Reputation data may be based on one or more of certifications, membership in associations, earned ratings, languages, translation history, etc.

Authors can search for translators based upon language and translator reputation, and translators can search for books based upon metrics via marketplace platform 302, which also facilitates contracting for translation services as further discussed below with regard to FIG. 10. In at least one embodiment, contracting 308 is facilitated via a module separate but connected to site 106. In some embodiments, contracting 308 may be facilitated by site 106 in conjunction with data mining manager 128 and/or translation marketplace module 204. Once a contract is finalized, the contract data such as the rights involved and the terms of the agreement are stored in database 310, and the translator translates the work at 312. In some embodiments, database 310 represents a database configured to protect confidentiality of the contract terms, such as a secure database. At 314, the translation is received, and in some embodiments, feedback is obtained on the translation at 316, such as via preview technology by previewing the translation to the reviewer community 134. Based on any feedback at 316, the process flow may return to 312 where the translation may be revised and/or finalized.

When a finalized translation is received at 314, a listing or item detail page for the translated work is produced indicating the translated work is available for purchase at 318. In some embodiments, other services and/or tools may be available to augment the listing at 320. These services may precede completing production of the listing, or may be obtained in concert with the listing. For example, services/tools may comprise merchandising, targeted reviews to generate buzz, printing promotional or other copies on demand, etc.

At 322, sales of the translated works are facilitated via a retailer. In some implementations, the retailer takes the form of a site that hosts an electronic catalog of items such as published works catalog 118, some of which users of the site may purchase or otherwise consume. Based on completed sales, payment is made to the author/rights holder 102 and translator 136 in accordance with the contract terms at 324.

FIG. 4 is illustrative of part of an example user interface (UI) of an author focused tool 400. As illustrated, the tool 400 enables authors or users associated with authors, such as rights holders to manage titles selected for republication including self-selected titles, by using the "Add a Title" option 402. Via the tool 400, authors can filter the titles displayed by fields presented via a drop-down box such as "Date Added," "ISBN/UPC/EAN" referring to the international standard book number, universal product code, or European article number as appropriate, "Title," "Formats," "Status," "Language," etc. at 404. In at least one embodiment, the filter defaults to present titles ordered by rights available. In some embodiments, authors may also search their titles via a search box 406. In some embodiments, the author may select an entry to obtain additional information, such as by clicking on an icon or text via a mouse or other selection device. For example, the author may click on the icon 408 associated with the title "Jacquelin's Journey" in order to obtain expanded information including such things as aggregate sales information, rights information, etc.

The tool may further present information via the example interface regarding media formats and/or derivative works for which rights may be separately held as shown at 410. The illustrated example shows that this rights holder has rights to "Grace and Me" in e-book and book formats, "Go, Griffin, Go: a Father's Tale" in book format, and "Jacquelin's Journey" in book and audio formats, although other formats are possible. In at least one embodiment, rights for different formats of individual works are presented separately by format, as illustrated. In some embodiments, rights may be designated separately based on other criteria, such as by language. In the illustrated embodiment, a status is presented at 412. In the illustrated example, each of the targeted republications are for translations, and the status is a translation status. However, in at least one other embodiment, targeted republications need not be translated, and the represented statuses may, in that case, correspond to a republication status such as receiving a proposal to obtain rights to republish a work in an e-book format, negotiating for republication of an out-of-print title, completing a contract for republication of a self-published work, and the like.

At 414, the tool 400 presents languages for which translation rights are available corresponding to each format for which the rights holder holds rights. In the illustrated example, the author has received a proposal for a French translation of the work titled "Grace and Me" for the e-book format, a German translation of the same work in book format is in review, negotiation with one or more translators for a Japanese translation of the work "Go, Griffin, Go: a Father's Tale" is in progress, and for the work Jacquelin's Journey" a German translation of the work in book format has been completed and is has been contracted for in audio format. However, other combinations of languages and formats are both possible and contemplated. In at least one implementation, an edit tool 416 enables the author to edit the entries for each work. In some embodiments, a selection is available to update all of an author's entries, such as at 418. In at least one embodiment, update all may populate additional works as well as updating format, status, and language of previously presented works. In at least one embodiment, site 106 provides for automatically updating an individual entry.

Figure 5:
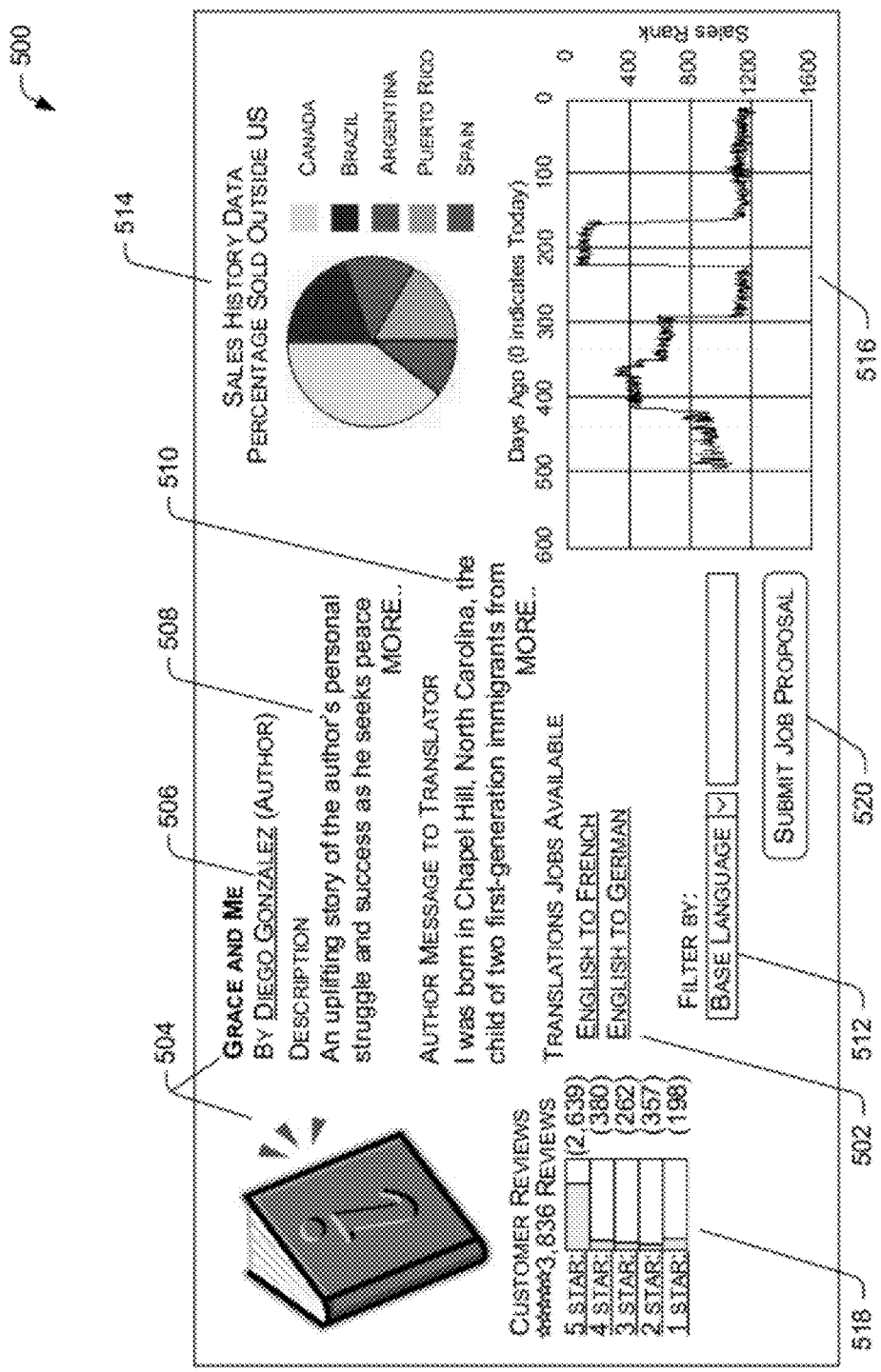
FIG. 5 illustrates an example user interface (UI) of a translator focused tool.

FIG. 5 is illustrative of part of an example user interface (UI) of a translator focused tool 500. As illustrated the tool 500 enables translators or users associated with translators, such as a translators' association or agency to make informed decisions regarding available translation job opportunities. In some embodiments, the presentation of translation jobs available is tailored based on one or more criteria such as information and/or credentials the translator submitted during a registration process, for example via web page 208, one or more reviews that the translator has received such as from reviewer community 134, and the length of time that the translation job has been posted. In the illustrated example, two translation jobs are being shown for one work at 502. This signifies that, in the illustrated example, the translator is registered as a translator from English to French and from English to German.

Information about particular works for which translation is sought may be presented in a multitude of arrangements. In the example presented the title of the published work is presented along with an image of the work at 504. In at least one embodiment, the title and/or the image are hyperlinked to a detailed description of the work, such as available from a retailer site 106. Similarly, the author is presented at 506, and may be hyperlinked to an author site as discussed in co-pending application Ser. No. 12/425,877, which is titled "Author Focused Tools" and was filed on Apr. 17, 2009. Additionally, at 508, a description of the work for which translation is sought may be provided in some embodiments. In at least one implementation an author message is presented to the translator as shown at 510.

In at least one embodiment, available translation jobs may be searched based on attributes such as base language, target language, genre of the work to be translated, ratings of the work to be translated, length of the work, etc. In the illustrated implementation, at 512, the presented available translation jobs may be filtered by base language, target language, an average rating, etc.

In the illustrated embodiment, various metrics of performance data are presented to translators to aid in selecting translation opportunities to pursue. In some embodiments, the price for translation is tied to metrics data such as sales history, sales rank, sales volume, reviews, etc. As shown at 514, sales percentages for sales outside of one country, in this example, the United States are presented. Additionally, for example, based on the sales chart showing sales in North America and several primarily Spanish speaking countries those international sales can show expected wider appeal of an author's work, thus indicating that translation into multiple languages may be warranted. In some embodiments, other metrics may be presented, such as the sales rank over a period of time as shown at 516, and/or customer reviews as shown at 518. In at least one embodiment, customer reviews 518 may include one or more hyperlinks to enable the translator to read reviews based on customer ratings (e.g., 5 stars, 4 out of 5 stars, etc.). In at least one embodiment, royalty terms that the translator may submit as part of a proposal to complete a translation job are pre-calculated based on one or more of these metrics. At 520, the user interface of the translator focused tool facilitates submitting proposals to perform translation jobs.

Illustrative Operation

Figure 6:
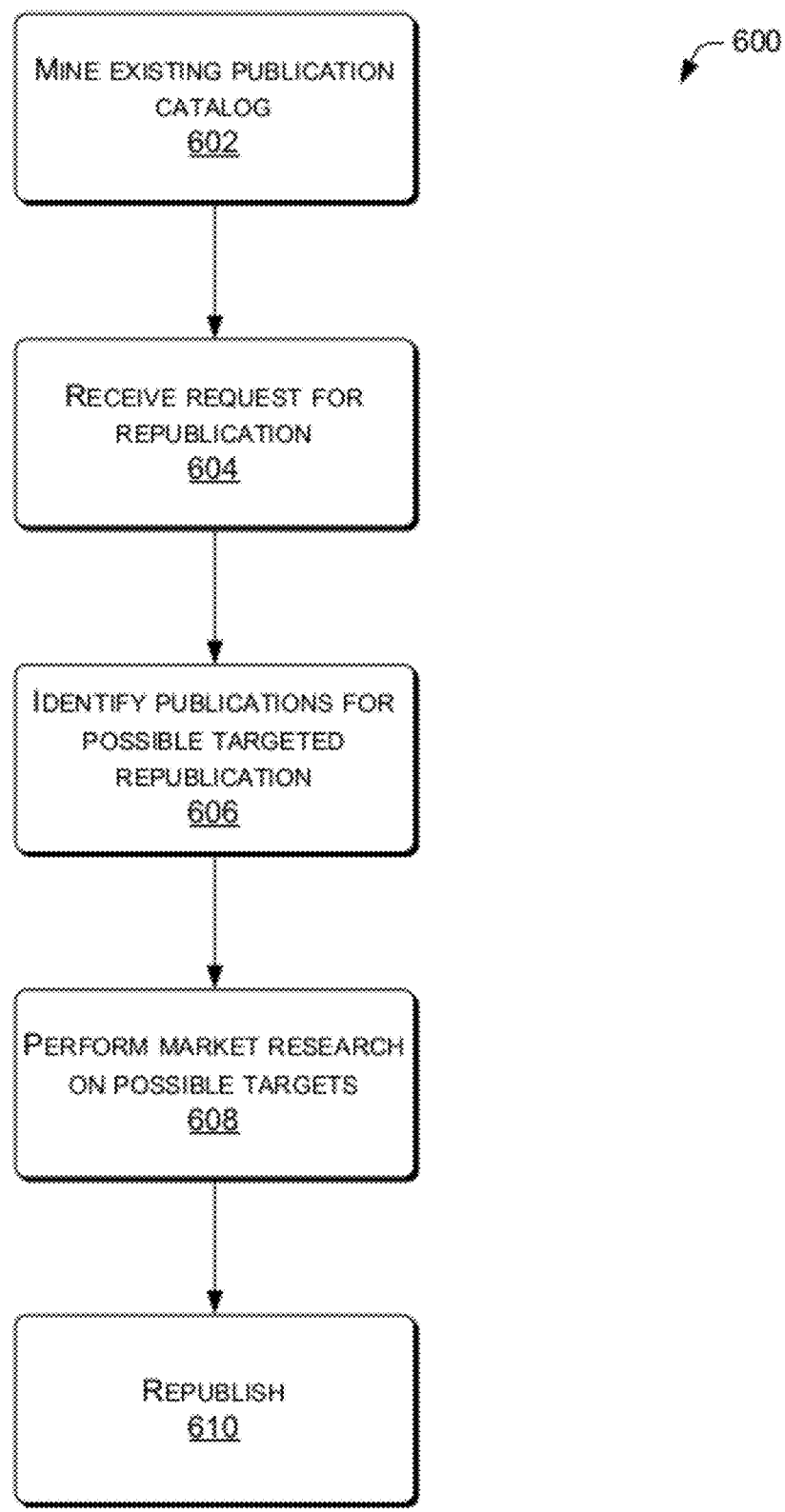
FIG. 6 is a flow diagram showing an illustrative process of data mining for targeted republishing.

Data mining manager 128 introduced in FIGS. 1 and 2 facilitates data mining for targeted republishing. For example, FIG. 6 is a flow diagram showing an illustrative process 600 of data mining according to at least one embodiment, in which works are identified for targeted republication.

In process 600, at 602, a catalog of publications such as published works catalog 118 is mined for information associated with particular publications. In some embodiments, alternately or additionally, at 604 requests for republications may be received. At 606, particular publications are identified for possible targeted republication based at least in part on the mined information associated with the particular publication such as number of units sold, ratio of units sold per venue, number of reviews, average ratings, association with other products, sales trends, etc. At 608, market research is conducted using reviewers who have been matched to possible target works. A more detailed discussion of a methodology for matching reviewers with authored works is provided in the co-pending application Ser. No. 11/540,931, which is titled "System and Method for Generating Comments on a Product" and was filed on Sep. 29, 2006. Based at least in part on the conducted market research, republication of one or more targets ensues at 610.

Figure 7:
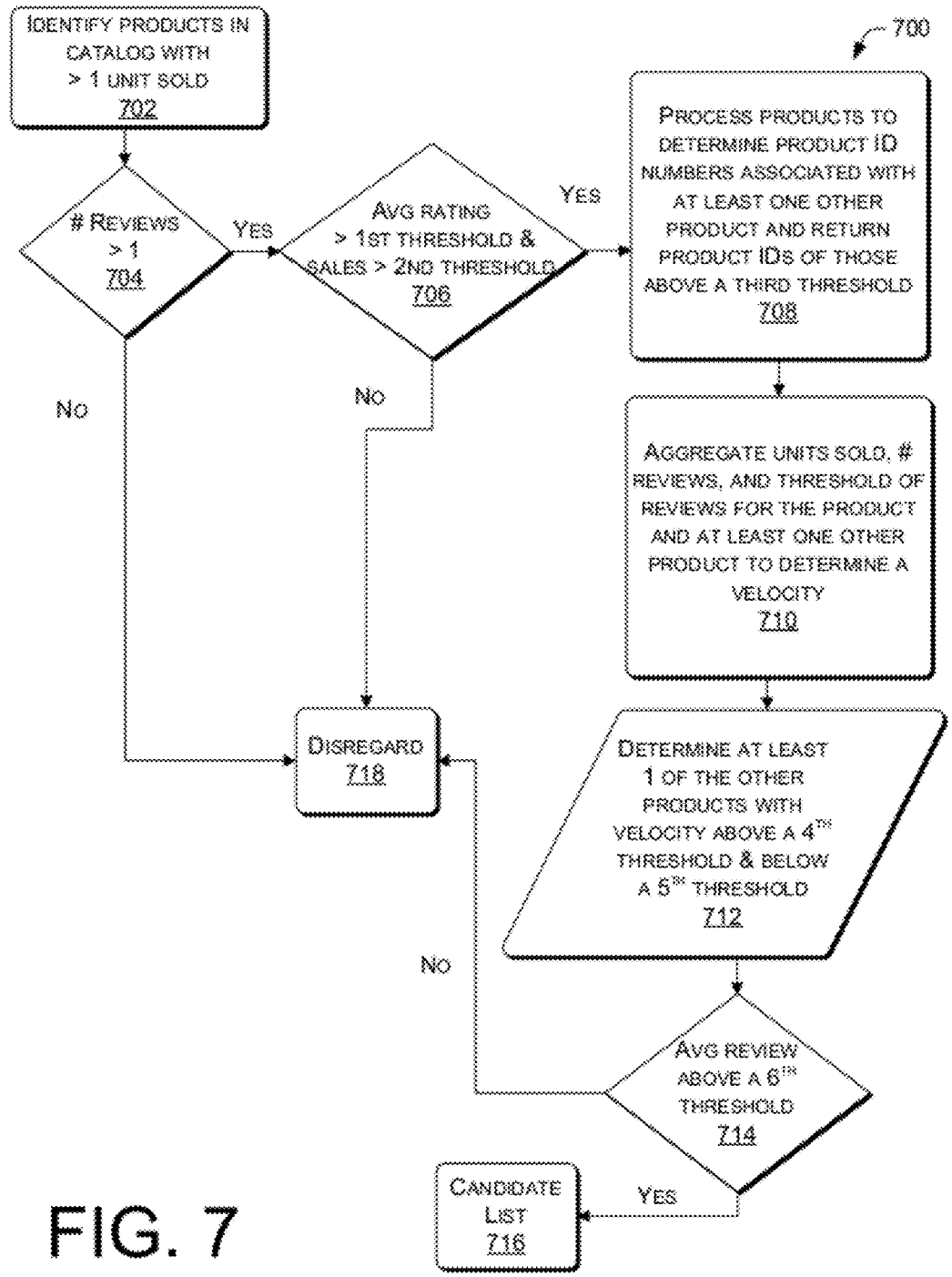
FIG. 7 is a flow diagram showing additional aspects of an illustrative process of data mining for targeted republishing.

FIG. 7 is a flow diagram showing an illustrative process 700 of data mining according to at least one embodiment. At 702, a catalog of products such as published works catalog 118 is accessed via data mining manager 128. In at least one embodiment, data mining manager 128 mines the catalog to identify products in the catalog having a first threshold number of sales (e.g., 1, more than 1, 10, etc.). In some embodiments, one aspect relates to filtering products based at least in part on other criteria, such as the ratio of units sold via one venue comprising the majority of sales of the product, or a threshold percentage of sales of the product. Another aspect for filtering may be the size of the current producer of the product, e.g., self-publishers, small publishers, mid-sized publishers, etc. The criteria above may be combined in one or more embodiments.

At 704, the product listings for which product sales met the first threshold number of sales are data mined to identify those having a threshold number of reviews (e.g., 1, more than 1, 10, etc.). At 706, the product listings indicating products having the threshold number of reviews are data mined to determine an average rating of the reviews (e.g., 6 out of 10, 6.5, 5). Also at 706, in one embodiment, those product listings having an average rating above a threshold (e.g., 6 out of 10, more than 6, 5), are further data mined to identify products having met or exceeded a second threshold number of sales (e.g., 10, a multiple of the first threshold, etc). In some embodiments, the number of sales are discounted or weighted based on geographical diversity. For example, when 75% of the sales are from a single metropolitan area or the author's home town. In at least one embodiment, the first and second sales thresholds are independent from each other. While in at least one other embodiment, the first and second sales thresholds are related.

At 708, the product listings indicating that products met the threshold average rating and/or the product's sales having met the second threshold number of sales are further processed to determine at least one other product associated with one or more of the products identified at 706. In at least one embodiment, 708 represents a similarity service whereby association signifies the products having a similarity such as an author in common, belonging to the same genre (e.g., science fiction, western, horror, historical fiction, popular fiction, non-fiction, self-help, etc.), having authors from within a radius distance of a geographical area, the products being related to a particular city, area, or person, etc., or combinations thereof. In at least one embodiment, a similarity service at 708 returns a correlation score based on weighting the relationship between a product and an associated product. In at least one embodiment, the product listings are further data mined to identify products and associated products having a score above a third threshold (e.g., 10,000) at 708.

In some embodiments, the correlation score is based at least in part on how frequently the product has been purchased with associated products having certain characteristics. For example, a higher score may be assigned for products purchased with associated products having consistent sales over time than a score assigned to products 1) purchased with associated products having low or inconsistent sales and/or 2) assigned to products purchased with associated best-sellers. Scores for associating with best-sellers are discounted in some implementations to normalize the effect of the velocity imparted by best-sellers on the correlation scores.

In some embodiments, the correlation score is based at least in part on genre and sub-category. For example, when the majority of sales of a product occur to customers purchasing products of the same genre and a sub-category of the genre, the correlation score may be weighted based on an assumption that these customers know the genre well and perceive that the product has value. Further, reviews may be added to the weighting and known reviewers may be given a higher weight. To illustrate, for a book about the internet, if customers who buy a lot of computer and internet books and buy the best selling computer and internet books account for the majority of sales of this internet book, data mining manager 128 implementing operation 708 determines that people who know the genre well see this internet book as a good book. In one implementation purchases and/or reviews from an audience of peers, (e.g., other author/creators) of the particular or a related genre may be given a higher weight.

At 710, data from the product listings identified at 708 is aggregated. In at least one embodiment, aggregation is performed by operating a pivot table on the data of a product listing and an associated product listing. The aggregation calculates presents and stores several criteria including one or more of: the sum of units sold of the product, the count of individual products, the average of unique product units by product ID, the average rating for the identified similar products, and the sum of the count of particular product reviews. In addition, in at least one embodiment, the aggregation calculates a velocity for the product based on the calculated criteria. In this context, velocity is a calculated sales trend based on data mined from associated products.

At 712, at least one of the product listings having a velocity above a fourth threshold and below a fifth threshold is identified (e.g., more than X and less than Y, more than 10 and less than 60, etc.).

At 714, of the product listings identified at 712, those with an average rating above a sixth threshold (e.g., more than 6 out of 10) are identified. At 716, the product listings identified at 714 are compiled into a list for further processing as discussed below. Product listings failing to meet the various thresholds in the process discussed above, are disregarded as shown at 718.

Figure 8:
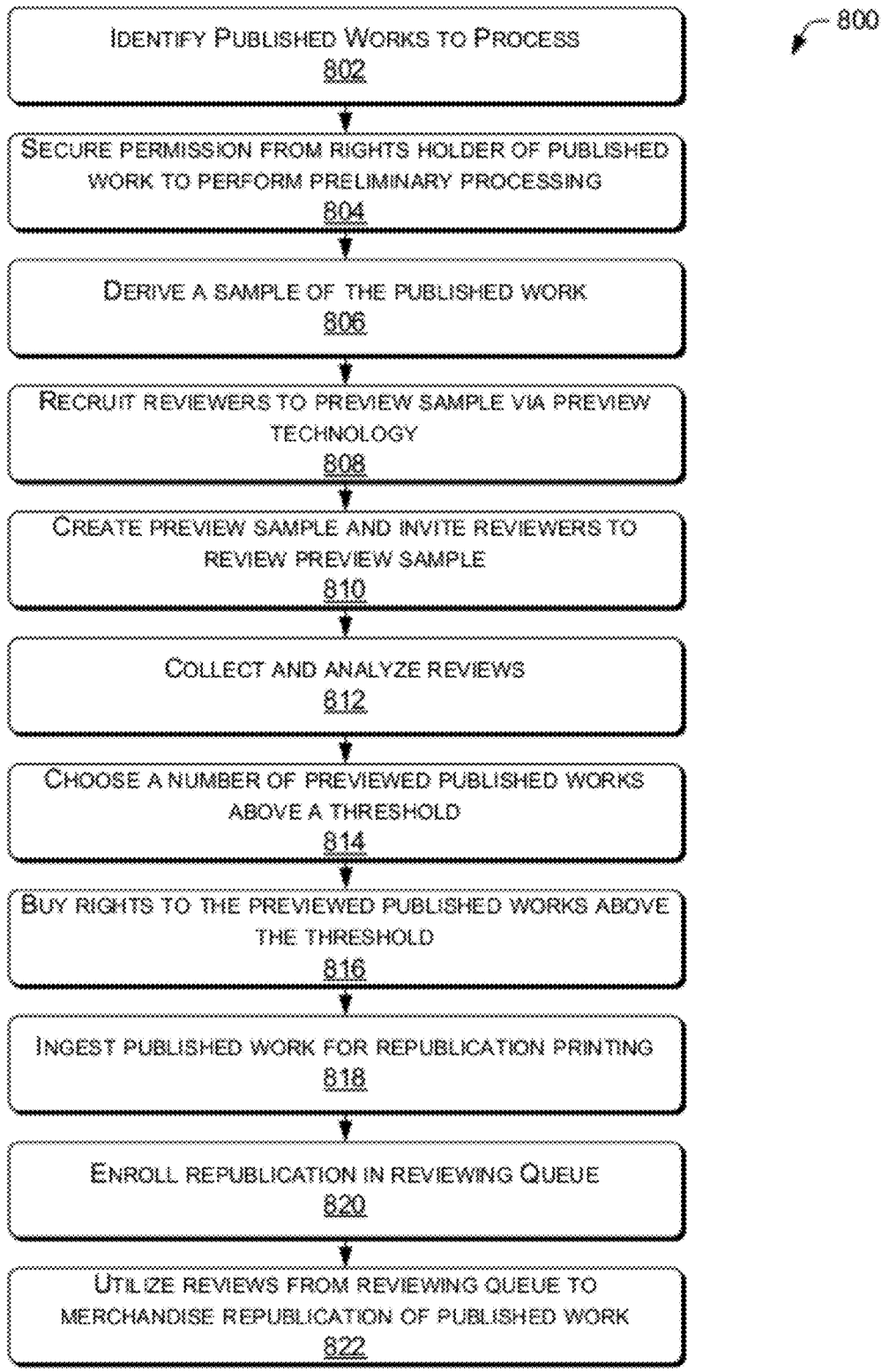
FIG. 8 is a flow diagram showing additional aspects of an illustrative process of data mining for targeted republishing.

FIG. 8 is a flow diagram showing an illustrative process 800 of data mining for targeted republication. At 802, data mining manager 128 identifies product listings to process. In at least one embodiment, the product listings are selected based on criteria such as the product having sales in one or more particular countries, having relatively consistent sales velocity above a first sales threshold (e.g., average>X/mo, average more than 10 sold per month for 6 months, etc.), and/or receiving a number of reviews above a threshold and the rating of the received reviews averaging above a threshold, (e.g., the product has received at least 5 reviews and the average rating of the received reviews is 4 or more out of 5). Selection criteria may further include one or more operations represented by process 700 such as processing at 708 to determine at least one other product associated with another of the products identified and mining sales data of the associated product(s) to identify product(s) having sales velocity above a second sales threshold. An additional aspect of at least one embodiment, may include further identifying products having a sales velocity below a sales threshold such as at 712. In addition, selection criteria may include aggregating the data such as at 710, and/or weighting the data in order to produce a ranked list of candidate products based on the selection criteria.

At 804, a determination is made of whether permission is needed from existing rights holder(s) for preliminary processing. If permission is needed, permission is secured to perform preliminary processing. For example, permission may be secured for deriving a sample of the product, providing previews of the product, etc. Permission may be in the form of a license of all or a part of the product, a purchase of a copy of the product, etc.

At 806, a sample of the product is derived. For example, a sample of a published work may represent a chapter, an abstract, a summary, etc. of the published work. Samples may also include information about the author/creator, and social networking information such as a providing a link to an author/creator's social networking page or blog.

At 808, reviewers are recruited to preview the sample. Reviewers may be identified to be recruited in a variety of ways including, in one example, via a process like 606 above or from a predetermined group of reviewers. In at least one embodiment, reviewers agree to use a preview technology to preview the sample.

At 810, a preview sample is created for use with the preview technology and recruited reviewers are invited to review the preview sample. In at least one embodiment, the preview sample comprises scanned images of the derived sample and recruited reviewers are invited via email. In some embodiments, reviewers are invited via a text message, an email, a blog posting, a newsletter, communication via a social networking site, or combinations thereof. In at least one embodiment, review of the preview sample comprises soliciting answers to one or more predetermined questions by, for example, radio buttons or selection boxes. Another aspect of the review may include soliciting comments via free text entry. Yet another aspect of the review may include providing a rating of the preview sample (e.g., 4 out of 5 stars). At 812, the reviews are collected and analyzed to determine a ranking of preview samples.

At 814, a number above a threshold of the ranked preview samples is chosen for further processing. For example, the top 10, those receiving an average rating of more than 5, the top 10% of those receiving an average rating of more than 5, etc. may be chosen for further processing.

At 816, the process 800 facilitates contracting for republication rights. In this context contracting includes two or more entities from author/creators, rights holders, translators, and/or merchants agree to terms and finalize a contract for republication including translation, in the event the work is to be translated. In at least one embodiment, the contracting is based on a variable pricing model such as a sliding revenue share based on realized versus forecasted sales (e.g., residuals or revenue sharing). In another embodiment, contracting is based at least in part on a flat fee.

At 818, the published work (e.g., book, audio book, newspaper, magazine, article, game, etc.) is ingested for republication printing. In this context "ingested for printing" means determining whether the translated product is a candidate for print on demand (POD) based on characteristics of the product having been translated, (e.g., how many pictures does the product include, should pictures be printed in color, etc.). Further, in an aspect of at least one embodiment, "ingested for printing" may mean, based at least in part on the sales forecast for the translated work, determining whether POD is cost effective. In addition, another aspect of "ingested for printing" means sending the translated product to a scanner vendor (e.g., a POD provider, a printer, etc.) for printing. In at least one embodiment, although the published work may not be a candidate for translation, the procedures employed parallel that represented by process 1000 such as at 1008.

At 820, the republication is enrolled in a reviewing queue. The reviewing queue may represent reviewers similar to those identified at 808, and/or the reviewers identified at 808 may represent a sub-group of the reviewing queue. In one embodiment, the republication may be announced to the reviewing queue in a variety of ways such as via a newsletter, a social networking site, email, etc. and copies of the republication may be distributed to the reviewing queue.

At 822, data that was mined from the reviews by the reviewing queue is utilized to merchandise the republication product. For example, in at least one embodiment, if the reviewers from the reviewing queue who were most positive about the republication product also read and or purchased another product, merchandising the republication product in connection with the other product. In at least one embodiment, whether and/or how the republication product is merchandised with another product depends at least in part of data mined regarding the other product, such as via process 700. In some embodiments, determinations between POD, traditional publishing, and other forms of publishing (e.g., electronic book readers) may influence marketing decisions and may be based at least in part on geographic diversity of sales of the product (as introduced in process 700) and/or geographic diversity of the positive reviews of the reviewing queue.

Figure 9:
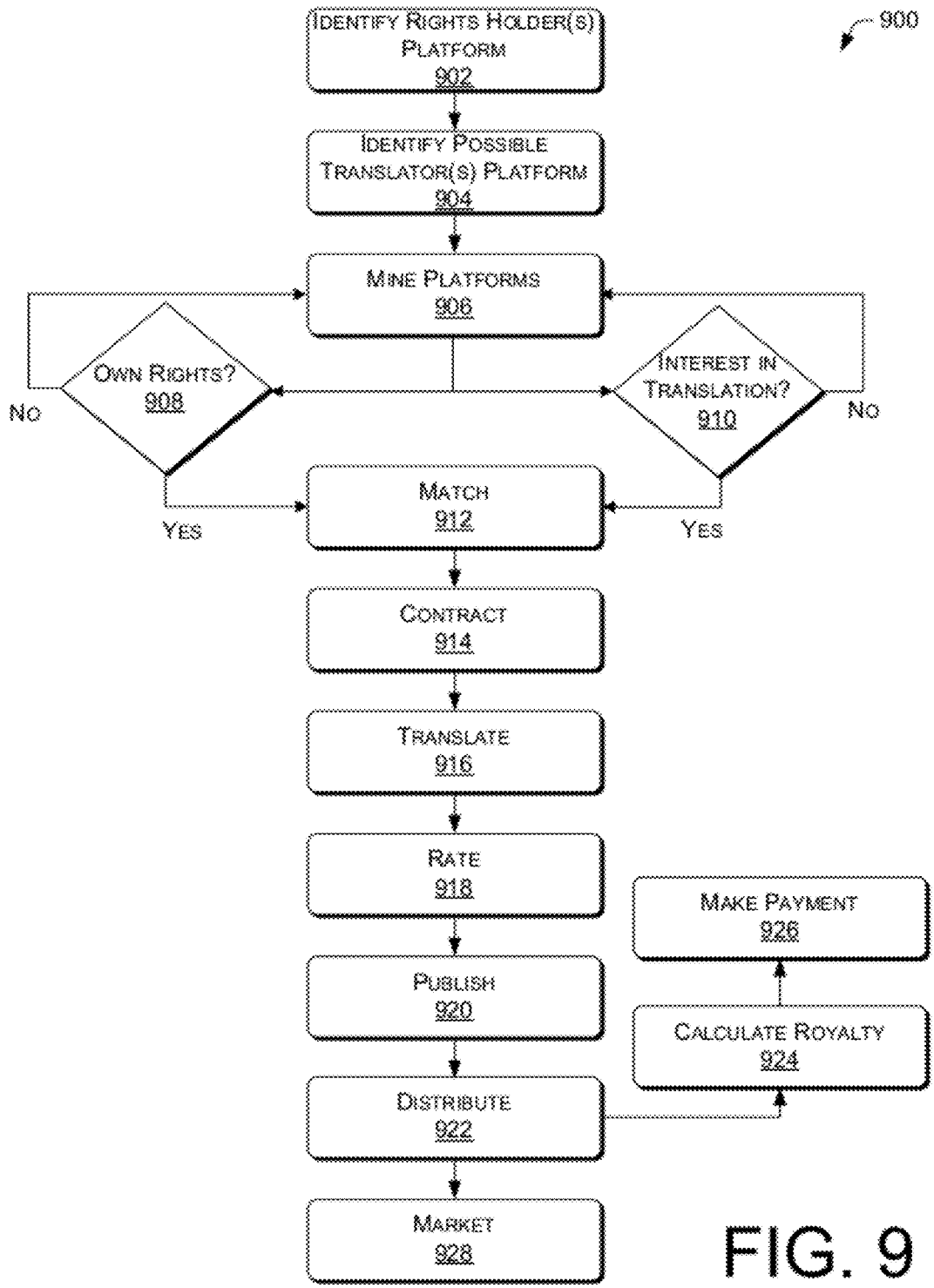
FIG. 9 is a flow diagram showing additional aspects of an illustrative process of data mining for targeted republishing.

FIG. 9 is a flow diagram showing an illustrative process 900 of data mining for targeted republication. In at least one embodiment, process 900 is performed under the control of a computing system, for example a server 110 and/or site 106 hosting an engine implementing process 900. In some embodiments, process 900 is performed partially by humans in coordination with the computing system. At 902, existing rights holder(s) platforms are identified such as an author focused tool (as provided in the co-pending application Ser. No. 12/425,877, which was filed on Apr. 17, 2009) and/or a vendor focused tool to allow vendors to participate in data mining for targeted republication. Similarly possible translators platforms are identified at 904 such as a translator focused tool, a translators' network, and/or a translators association. At 906 identified platforms are mined to identify works for targeted republication. As shown at 908 a determination is made whether an entity owns rights for which republication may be desired. At 910 a determination is made whether a possible translator may be interested in translating a work for which republication is desired. If either determination is negative, the respective platform is further mined until one or more matches are identified at 912.

Based on a match identified at 912, an offer to facilitate republication may be presented to one or more rights holders and a solicitation for translation services may be presented to one or more translators. Thus, an entity utilizing process 900 may generate one or more proposed contracts at 914. In some embodiments, the entity may be a party to one or more of the contracts. In some embodiments, the entity may not be a party, but may facilitate the contracts. In at least one embodiment, the entity may be a party to some contracts and a facilitator who is not a party to other contracts.

One or more translators undertake translation at 916. In at least one embodiment, multiple translators may be employed for any of a variety of reasons such as a back-up mechanism, for quality-control, etc. In some embodiments, multiple sample or excerpt translations are obtained from the multiple translators. In at least one embodiment, a translation is given a rating at 918. In implementations where more than one translation was obtained either of excerpts or samples, or for translations of a work, the rating may be added to criteria used to determine which translation contract to finalize. In at least one embodiment, a completed translation of a work is given a rating at 918.

Publishing of the translated work in the contracted format(s) is undertaken at 920, and at 922 distribution of the translated work ensues via one or more distribution avenues. At 924 royalties for translated copies distributed are calculated based on the terms of the contract, and at 926, payment to each party entitled to royalties ensues. In at least one embodiment, marketing may be performed at 928, and may be included in the contract terms. In some embodiments, marketing is performed by the entity utilizing process 900, such as by a retailer associated with site 106. In at least one embodiment, marketing may be performed by separate entity. In various embodiments, marketing may include, for example, enhanced placement of the translated work, merchandising the translated work in association with one or more other works, obtaining targeted reviews and promoting the translated work using the targeted reviews to generate buzz about the translated work, etc.

Figure 10:
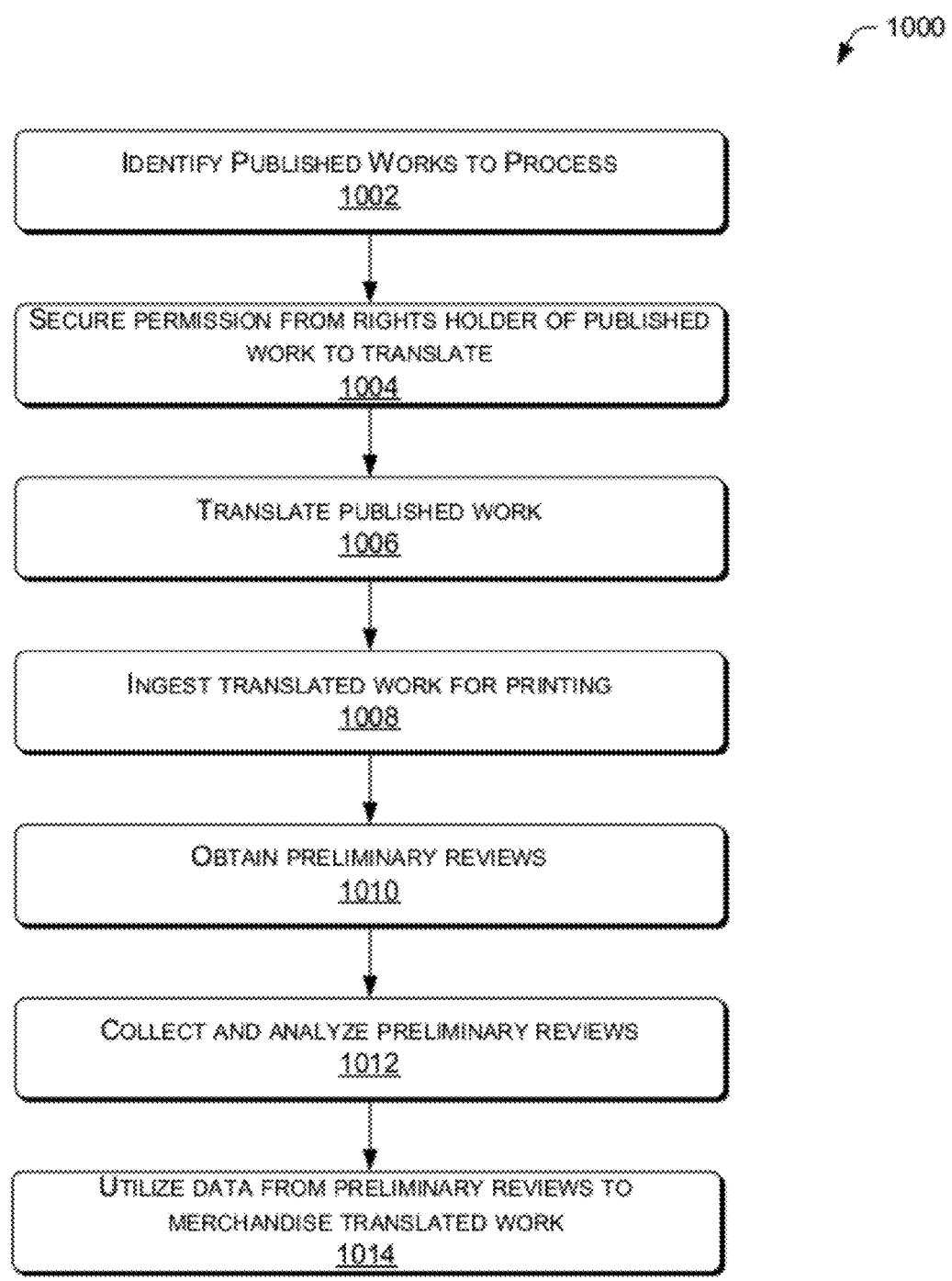
FIG. 10 is a flow diagram showing additional aspects of an illustrative process of data mining for targeted republishing.

FIG. 10 is a flow diagram showing an illustrative process 1000 of data mining for targeted republication. At 1002, data mining manager 128 identifies product listings to process. In at least one embodiment, the product listings are selected based on criteria such as having a high sales rank in a particular country, in a particular language, or from a particular sales venue such as via online sales. Selection criteria may further include having a high sales velocity, and expectation to have appeal to consumers outside of the particular country, in other language(s), and/or from different sales venues. In addition, selection criteria may include the product not being available to consumers outside of the particular country, in other language(s), and/or from different sales venues.

For example, one or more published works (e.g., books, audio books, newspapers, magazines, articles, games, etc.) may be identified and selected at 1002 based on mined criteria such as having a high sales rank in the country of Germany, in the German language, having a sales velocity above a configurable threshold, an expectation of appeal to a wider audience, and the published work not being available in English.

One way for data mining manager 128 to calculate expectation of wider appeal is by identifying a correlation between published works being considered at 1002 and other published works which are determined to be best-sellers or high-sellers in both the German language and the English language.

At 1004, information about the identified product listings of 1002 is mined to determine which products have rights available in another language (e.g., the product is published in German but has one or more of English, French, Spanish, Japanese, Mandarin, and Hindi rights available, etc.). Based on the mined information, securing permission from existing rights holder(s) to translate to one or more targeted languages. For example, if English language rights are available, securing rights to English translation. In at least one embodiment, once the existing rights holders and one or more of translators 136(1)-(M) reach agreement, distribution rights for the translated work are assumed by an entity other than the existing rights holder, the author, or the translator, such as an entity associated with data mining manager 128 introduced in FIG. 1.

At 1006, products for which rights have been secured in one or more languages are translated, such as by the architecture 200 introduced in FIG. 2, above. For example, a published work is translated from German to English. In at least one embodiment, translation services of translators 136(1)-(M) are contracted via a bidding process facilitated by translation marketplace module 204. In an aspect of at least one embodiment, the bidding process for translation may directly involve the translation marketplace such as implemented by translation marketplace module 204. Another aspect of the translation marketplace may include targeted revealing of translation opportunities to potential translators such as to groups of translators 136(1) without revealing the opportunities to another group such as 136(M). In at least one aspect, weighting and/or discounts for the services of particular translators and/or groups of translators may be based at least in part on a reviewing system, time within translation queue of one or both of the translation opportunity 210 and translator 136, and/or sales information of a translation opportunity. In at least one embodiment, targeted revealing of translation opportunities to potential translators is based at least in part on a plurality of reviews of particular translators and sales information of the translation opportunity.

In at least one embodiment, translation at 1006 is initiated by an author/creator 102 indicating a translation opportunity 210, and translator 136 locating translation opportunity 210 via a search based on criteria such as the language in which translation opportunity 210 has been published, the language for which translation is sought, the genre of translation opportunity 210, ratings of one or more of translation opportunity 210, the author/creator, and the translator, the length of translation opportunity 210, and a timeline for completion of the translation.

For some embodiments, a correspondence score may be assigned to particular translators based on their previous translation work. One or more translators may have the same correspondence scores, and one or more correspondence scores may be assigned to an individual translator, e.g., a translator who works in more than one language may have a correspondence score for each language in which translations are completed. In some embodiments, the correspondence score may be based on criteria such as a quality review of the translator's previous work, timeliness of the translator's previous work, the translator holding one or more credentials, the translator's participation in reviewing other translators, and the like. Thus, over time a correspondence score for a particular translator may change. In yet additional aspects, contract for translation services may be based on proposed time for completion and may include predetermined and/or configurable milestones, may be per word, may involve volume discounting, and/or may be associated with sales forecasts for the translated work (e.g., residuals, royalties, revenue sharing, etc.).

For example, in at least one embodiment, contracted terms for translation services may include the translator receiving X % or revenue until $N of royalties have been paid, and at $N royalties paid, the translator will receive Y % revenue and the author or rights holder will receive Z % revenue. Where X, Y, Z, and N are values calculated based at least in part on one or more predetermined criteria such as the translator's correspondence score, correlation research, preliminary review of the translator's work in the target language, reviews of the publication in another language, and calculations of anticipated republication sales.

At 1008, the translated product is ingested for printing. In this context "ingested for printing" means determining whether the translated product is a candidate for print on demand (POD) based on characteristics of the product having been translated, (e.g., how many pictures does the product include, should pictures be printed in color, etc.). Further, in an aspect of at least one embodiment, "ingested for printing" may mean, based at least in part on the sales forecast for the translated work, determining whether POD is cost effective. In addition, another aspect of "ingested for printing" means sending the translated product to a scanner vendor (e.g., a POD provider, a printer, etc.) for printing.

At 1010, preliminary review(s) of the translated product are obtained from one or more reviewers. In at least one embodiment, preliminary reviewers are selected via a process as described regarding 606, above. In another embodiment, preliminary reviewers are selected from a predetermined group of reviewers based on at least one of having a correspondence score above a definable threshold, belonging to an affinity group and/or identified reading/use habits such as based on genre, author associations, geographical associations, subject matter, etc. In another aspect, preliminary reviewers may be recruited based on the above characteristics.

At 1012, preliminary reviews are collected and analyzed to mine data to be used in merchandizing the translated product. For example, if preliminary reviews were particularly positive for one demographic group, determining that initial merchandizing of the translated product to others in that demographic group via avenues previously identified to be preferred for that demographic group is likely to generate buzz about the translated product in the marketplace.

At 1014, data that was mined from the preliminary reviews is utilized to merchandise the translated product. For example, if the preliminary reviewers who were most positive about the translated work also read and or purchased another product, merchandising the translated product in connection with the other product. In at least one embodiment, whether and/or how the translated product is merchandised with another product depends at least in part of data mined regarding the other product, such as via process 700.

Figure 11:
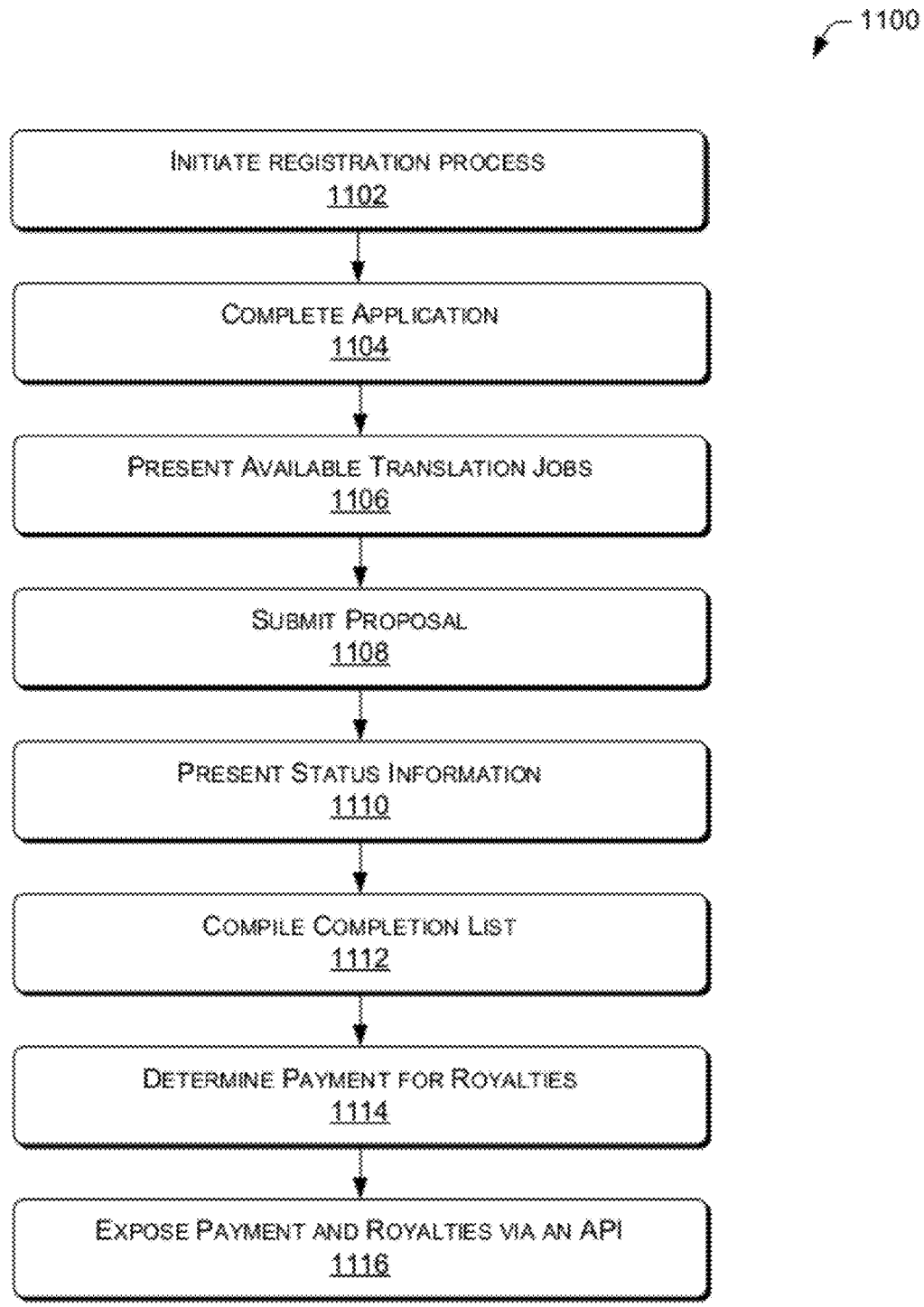
FIG. 11 is a flow diagram showing additional aspects of an illustrative process of data mining for targeted republishing.

FIG. 11 is a flow diagram showing an illustrative process 1100 of sourcing translations for targeted republication via a translators-services tool. In at least one embodiment, the translators-services tool is accessed via a site such as site 106 and served as part of an appropriate web page, such as web page 208. In some embodiments, web page 208 may comprise part of a translators portal 306 via which potential translators may register as translators, view translation jobs, submit translation proposals, work with the author/creator in the translation process, etc. At 1102 the registration process is initiated with service of information about the translators portal such as information about the republications process as it relates to translations, information about working with authors/creators, expectations for the translator, and the like.

At 1104 the potential translator begins registration by completing an application. In some embodiments, completing the application includes providing languages from which the potential translator can translate (base languages) and languages to which the potential translator can translate (target languages). In at least one embodiment, these are submitted in base-language/target-language pairs. In some embodiments, one or more of contact information, certifications, and translation samples are provided. In at least one embodiment, uploading translation samples in one or more of .pdf, .doc, and .html formats is facilitated via the translators portal. In some embodiments, the translation samples are reviewed by one or more reviewers such as from reviewer community 134, and based on the review additional samples may be requested, additional information may be requested, the potential translator may be approved, and/or the potential translator may be denied. In at least one embodiment, payment information to be used for completed translation contracts is also provided by the potential translator during the registration process. In another embodiment, payment information is provided after the potential translator is approved.

At 1106 the translator is presented translation jobs available to them. In at least one embodiment, the jobs presented are filtered based on one or more of the base language, the target language, and the rating of the particular translator. In some embodiments, the translator may search translation jobs based on one or more of base language, target language, genre of the work for which translation is sought, length of work, and one or more ratings of the work for which translation is sought, the author/creator of the work for which translation is sought, and the potential translator. In at least one embodiment, information about each translation job is viewable in a list of translation jobs available to the translator. In some embodiments, additional information is served to the translator upon the translator selecting an available job. In at least one embodiment, information made available in the list view and/or via selection may be user configurable and may include author information, genre information, sales information for the work for which translation is sought, languages in which the work is currently available, an excerpt from the work, the length of the work, a note from the author, etc.

At 1108 the translator submits a proposal to complete one or more translation jobs and the proposal is received via a translators portal. In at least one embodiment, terms of the proposal are pre-calculated by a translators-services tool based on one or more of ratings of the translator from previous translation jobs, sales volume of the work to be translated in the original language, the length of the work to be translated, the language into which translation is sought, the time in which translation is sought, etc. For example, in at least one embodiment, contracted terms for translation services may include the translator receiving X % or revenue until $N of royalties have been paid, and at $N royalties paid, the translator will receive Y % revenue and the author or rights holder will receive Z % revenue. Where X, Y, Z, and N are values calculated based at least in part on one or more predetermined criteria such as the translator's correspondence score, correlation research, preliminary review of the translator's work in the target language, reviews of the publication in another language, and calculations of anticipated republication sales.

In some embodiments, the terms may provide a range within which negotiations are based and from which contract terms are formed. For example, one or more of the X, Y, Z, and N values may represent a range of around 2%, 5%, 10%, etc. Although other ranges are contemplated. In at least one embodiment, X, Y, Z, and N values may represent one of a mid-point, a high-point, or a low-point of the pre-calculated range. In at least one embodiment, the range may be affected by the translator and/or the author requesting an intermediary to assist in the negotiation. In some embodiments, and assistance of an intermediary is a part of the pre-calculated terms, whether or not a range is provided for negotiation.

At 1110 status information for translation proposals is provided. Status information includes, for example previously submitted bid proposals and bid proposals in negotiation. In at least one embodiment, status information may include information regarding translation contracts in progress. In some embodiments, tracking translation contracts may also or alternately be presented separate from other status information.

At 1116 a list of works for which translation is complete is compiled. In some embodiments, the list is configurable by the translators-services tool based on one or more of ratings of the translator for the completed translation job, sales volume of the translated work, the length of the translated work, the language into which the translation was completed, the time in which the translation was completed, etc. In at least one embodiment, the list is further configured to be searchable.

At 1118 payment is determined for royalties for translations. Royalties for translations are calculated based on terms agreed upon by the translator and the author. In some embodiments, the royalties calculation represents a revenue share to be paid to the translator and a revenue share to be paid to the author or user associated with the author based on a set of rules determined by contract. In at least one embodiment, the royalties calculation may further include a fixed fee component. In some embodiments, the currency in which royalties are calculated is standardized. In at least one embodiment, the currency in which royalties are calculated is configurable. In at least one embodiment, the format in which the translated work is sold is a factor in the royalties calculation. In some embodiments, payment is determined in a common currency per translator. In at least one embodiment, the currency for payment is determined for each translation job, and converted to a currency indicated as preferred by the payee during a registration process.

At 1160 payment and royalties information is exposed by an API accessed via an authors-services tool and the translators-services tool.

Conclusion

Although the subject matter has been described in language specific to structural features and/or methodological acts, the subject matter defined in the appended claims is not necessarily limited to the specific features or acts described. Rather, the specific features and acts are disclosed as exemplary forms of implementing the claims. For example, in at least one embodiment, process 600 as discussed regarding FIG. 6, is performed independently of processes 700, 800, 900, 1000, and 1100 as discussed regarding FIGS. 7, 8, 9, 10, and 11. However, in other embodiments, performance of one or more of the processes 700, 800, 900, 1000, and 1100 may be incorporated in, or performed in conjunction with, process 600. For example, process 700 may be performed in lieu of blocks 602 and/or 604 and 606 of FIG. 6.

Processes described herein are illustrated as a collection of blocks in a logical flow graph, which represent a sequence of operations that can be implemented in hardware, software, or a combination thereof. In the context of software, the blocks represent computer-executable instructions stored on memory 114 that, when executed by one or more processors 112, configure a computing system to perform the recited operations. Generally, computer-executable instructions include routines, programs, objects, components, modules, data structures, and the like that perform particular functions or implement particular abstract data types. The order in which the operations are described is not intended to be construed as a limitation, and any number of the described blocks can be combined in any order and/or in parallel to implement the process. In various embodiments, the structures of the described architecture may exist independently, in tandem, or as part of an integrated or dispersed system. Furthermore in various embodiments, the described processes may be performed independently, sequentially, interleaved, or in parallel by the described or other architectures without deviating from the spirit of this disclosure.

What is claimed is:

1. A method comprising:
   identifying, from a database on a computer system, products having a sales rank above a predetermined threshold in a first language;
   determining, via a processor of the computer system, a product printed in the first language without being printed in a second language from among the products having the sales rank above a predetermined threshold in the first language;
   ascertaining, via the processor computer system, whether rights to print the product in the second language are available;
   acquiring the rights to print the product in the second language when the rights to print the product in the second language are available; and
   recommending printing a translation of the product in the second language.

2. The method of claim 1, further comprising:
   obtaining one or more bids for translating the product into the second language; and
   providing a forum for contracting for translation of the product into the second language.

3. The method of claim 1, further comprising obtaining a review of the product in the second language.

4. The method of claim 3, further comprising publicizing the product in the second language based at least in part on the review of the product in the second language.

5. The method of claim 1, further comprising providing the product for sale in the second language.

6. The method of claim 5, further comprising evaluating a return on investment of the product in the second language.

7. The method of claim 1, further comprising:
   identifying particular products from a product catalog for possible targeted republication based at least in part on mined information associated with the particular products;
   analyzing data on the identified particular products to be targeted for republication including data gathered from market research; and
   designating one or more of the particular products for republication based at least in part on the market research.

8. The method of claim 1, wherein the database comprises a database of printed works and the products comprise printed works.

9. The method of claim 1, wherein the sales rank in the first language is based at least in part on a received review.

10. A system comprising:
a processor; and
a memory operably coupled to the processor and storing instructions to configure the processor to perform operations comprising:
mining product information to identify information to generate increased product sales;
filtering product information to identify products with a potential for sales above a sales expectation, the potential for sales being based at least in part on minimum sales thresholds in a first language and relationships with other products having consistent sales in the first language; and
producing a candidate list of product identifiers of products as candidates for translation into another language based at least in part on the mining and filtering.

11. The system recited in claim 10, wherein the operations further comprise:
creating a preview space for the products identified by the product identifiers on the candidate list;
inviting one or more reviewers to review, via the preview space, the products identified; and
ingesting for publication, based at least in part on reviews from the preview space, selected of the products identified.

12. The system recited in claim 10, wherein the filtering further comprises identifying products having been printed in the first language without having been printed in a second language.

13. The system recited in claim 10, wherein the filtering further comprises identifying one or more of the other products having consistent sales in a first country and having been printed in a first language as a language of the first country, the one or more other products also having been printed in a second language and having consistent sales in the second language.

14. The system recited in claim 10, wherein the product identifiers comprise unique product identifiers.

15. A non-transitory computer-readable medium having recorded thereon computer-readable instructions to program a computer to perform acts comprising:
identifying, from a database on the computer, products having a sales rank above a predetermined threshold in a first language;
determining a product printed in the first language without being printed in a second language from among the products having the sales rank above a predetermined threshold in the first language;
ascertaining whether rights to print the product in the second language are available;
acquiring the rights to print the product in the second language when the rights to print the product in the second language are available; and
recommending creating a translation of the product in the second language.

16. The non-transitory computer-readable medium of claim 15, the acts further comprising:
obtaining one or more bids for translating the product into the second language; and
providing a forum for contracting for translation of the product into the second language.

17. The non-transitory computer-readable medium of claim 15, the acts further comprising obtaining a review of the product in the second language.

18. The non-transitory computer-readable medium of claim 17, the acts further comprising publicizing the product in the second language based at least in part on the review of the product in the second language.

19. The non-transitory computer-readable medium of claim 15, the acts further comprising providing the product for sale in the second language.

20. The non-transitory computer-readable medium of claim 15, the acts further comprising evaluating a return on investment of the product in the second language.

21. The non-transitory computer-readable medium of claim 15, the acts further comprising:
identifying particular products from a product catalog for possible targeted republication based at least in part on mined information associated with the particular products;
analyzing data on the identified particular products to be targeted for republication including data gathered from market research; and
designating one or more of the particular products for republication based at least in part on the market research.

22. The non-transitory computer-readable medium of claim 15, wherein the database comprises a database of printed works and the products comprise printed works.

23. The non-transitory computer-readable medium of claim 15, wherein the sales rank in the first language is based at least in part on a received review.

24. A system comprising:
a processor;
a memory coupled to the processor and storing instructions to configure the processor to perform operations comprising:
identifying, from a datastore on a computer system, products having a sales rank above a predetermined threshold in a first language;
determining a product printed in the first language without being printed in a second language from among the products having the sales rank above a predetermined threshold in the first language;
ascertaining whether rights to print the product in the second language are available;
acquiring the rights to print the product in the second language when the rights to print the product in the second language are available; and
recommending creating a translation of the product in the second language.

25. The system of claim 24, the operations further comprising:
obtaining one or more bids for translating the product into the second language; and
providing a forum for contracting for translation of the product into the second language.

26. The system of claim 24, the operations obtaining a review of the product in the second language.

27. The system of claim 26, the operations publicizing the product in the second language based at least in part on the review of the product in the second language.

28. The system of claim 24, the operations providing the product for sale in the second language.

29. The system of claim 24, the operations evaluating a return on investment of the product in the second language.

30. The system of claim 24, the operations:
identifying particular products from a product catalog for possible targeted republication based at least in part on mined information associated with the particular products;

analyzing data on the identified particular products to be targeted for republication including data gathered from market research; and designating one or more of the particular products for republication based at least in part on the market research.

31. The system of claim 24, wherein the database comprises a database of printed works and the products comprise printed works.

32. The system of claim 24, wherein the sales rank in the first language is based at least in part on a received review.

33. A memory having recorded thereon computer-readable instructions to program a computer to perform acts comprising:

mining product information to identify information to generate increased product sales;

filtering product information to identify products with a potential for sales above a sales expectation, the potential for sales being based at least in part on minimum sales thresholds in a first language and relationships with other products having consistent sales in the first language; and producing a candidate list of product identifiers of products as candidates for translation into another language based at least in part on the mining and filtering.

34. The memory recited in claim 33, wherein the acts further comprise:

creating a preview space for the products identified by the product identifiers on the candidate list;

inviting one or more reviewers to review, via the preview space, the products identified; and ingesting for publication, based at least in part on reviews from the preview space, selected of the products identified.

35. The memory recited in claim 33, wherein the filtering further comprises identifying products having been printed in the first language without having been printed in a second language.

36. The memory recited in claim 33, wherein the filtering further comprises identifying one or more of the other products having consistent sales in a first country and having been printed in the first language as a language of the first country, the one or more other products also having been printed in a second language and having consistent sales in the second language.

37. The memory recited in claim 33, wherein the product identifiers comprise unique product identifiers.

38. A method comprising:

mining, via a processor of a computer system, product information to identify information to generate increased product sales;

filtering, via the processor of the computer system, the product information to identify products with a potential for sales above a sales expectation, the potential for sales being based at least in part on minimum sales thresholds in a first language and relationships with other products having consistent sales in the first language; and producing, via the processor of the computer system, a candidate list of product identifiers of products as candidates for translation into another language based at least in part on the mining and filtering.

39. The method recited in claim 38, further comprising:

creating a preview space for the products identified by the product identifiers on the candidate list;

inviting one or more reviewers to review, via the preview space, the products identified; and ingesting for publication, based at least in part on reviews from the preview space, selected of the products identified.

40. The method recited in claim 38, wherein the filtering further comprises identifying products having been printed in the first language without having been printed in a second language.

41. The method recited in claim 38, wherein the filtering further comprises identifying one or more of the other products having consistent sales in a first country and having been printed in a first language as a language of the first country, the one or more other products also having been printed in a second language and having consistent sales in the second language.

* * * * *